United States Patent [19]

Asnes

[11] 3,922,435
[45] Nov. 25, 1975

[54] HEAT TRANSFER LABEL
[75] Inventor: Benjamin Asnes, Framingham, Mass.
[73] Assignee: Dennison Manufacturing Company, Framingham, Mass.
[22] Filed: Apr. 14, 1972
[21] Appl. No.: 244,292

Related U.S. Application Data
[63] Continuation-in-part of Ser. No. 189,748, Oct. 15, 1971, abandoned, Continuation-in-part of Ser. No. 189,747, Oct. 15, 1971, abandoned.

[52] U.S. Cl. ............... 428/349; 428/413; 428/500; 428/520; 428/914; 156/240
[51] Int. Cl.² ................. B32B 27/08; B32B 27/10; G09J 07/02
[58] Field of Search .......... 117/3.4, 33.5 R, 33.5 T; 156/64, 67, 240; 161/406, 413, 248, 228, 167; 250/461

[56] References Cited
UNITED STATES PATENTS

| | | | |
|---|---|---|---|
| 1,882,593 | 10/1932 | Hentschel | 117/3.4 |
| 2,333,641 | 11/1943 | Corwin | 161/406 UX |
| 2,375,177 | 5/1945 | Reese | 156/240 X |
| 2,458,104 | 1/1949 | Schweizer | 156/67 |
| 2,521,953 | 9/1950 | Tuttle | 250/459 |
| 2,556,078 | 6/1951 | Francis, Jr. | 117/3.4 X |
| 2,558,804 | 7/1951 | Wittgren | 161/406 X |
| 2,746,893 | 5/1956 | Matthes | 161/406 X |
| 3,001,311 | 9/1961 | Holsapple | 156/67 X |
| 3,516,842 | 6/1970 | Klinker, Jr. et al. | 117/3.4 |
| 3,536,550 | 10/1970 | Von Hofe | 156/64 |
| 3,551,241 | 12/1970 | Heeb et al. | 161/406 X |
| 3,634,614 | 1/1972 | Geusic et al. | 250/458 X |
| 3,660,196 | 5/1972 | Keeling et al. | 156/240 X |

Primary Examiner—Charles E. Van Horn
Assistant Examiner—Thomas Bokan
Attorney, Agent, or Firm—George E. Kersey

[57] ABSTRACT

A dry-release heat transfer label for objects such as plastic bottles. The label is formed by a resinous release layer on a suitable temporary carrier, with a transfer layer, including a design print on the release layer and a heat-activatable thermoplastic adhesive layer upon the transfer layer. The composition of the release layer and the transfer layer are such that at heat transfer temperatures, the relative strengths of the bonds between then and their cohesiveness, permit the release layer, with its temporary carrier, to be stripped from the transfer layer which remains adhered to the object without leaving any substantial amount of the transfer layer with the release layer. The transfer layer is preferably formed by a clear lacquer printed on the release layer with a design print in registry with it and a clear adhesive layer. The clear lacquer and adhesive layers desirably contain a fluorescent dye for accurate registration during printing using ultraviolet light, an inert, cross-linked, thermoset polymeric resin is employed to achieve the desired bond strength between release and transfer layers.

11 Claims, No Drawings

HEAT TRANSFER LABEL

RELATED PATENT APPLICATIONS

This application is a continuation-in-part of my copending U.S. patent application Ser. Nos. 189,748 and 189,747 filed Oct. 15, 1971 both now abandoned.

BACKGROUND OF THE INVENTION

1. Introduction

This subject invention relates to heat transfers for labelling and particularly, to improvements in release properties of dry heat transfers, in printing such transfers and in transferring such transfers to a transfer surface, such as a plastic bottle.

2. The problems solved by the invention.

The art of heat transfer labelling is very old and described in an early U.S. Pat. No. 1,030,908 to McKerrow which patent describes a heat transfer label having a paper backing, a transfer layer of resin or wax, a design of printing and coloring upon the transfer layer. The transfer layers of McKerrow and those who followed as illustrated in U.S. Pat. Nos. 1,331,581; 1,882,593; 2,219,071 and 2,667,003, have not been entirely satisfactory for a number of reasons, particularly when transferred and applied to plastic containers.

Improved heat transfer labels based upon the use of oxidized waxes as a release layer are in substantial commercial use and are disclosed in U.S. Pat. No. 2,862,832 of Shepherd which discloses a heat transfer label comprising a wax release layer on a suitable carrier, an ink layer on the wax release layer and a heat-activatable thermoplastic adhesive layer over the ink layer. Though such heat transfer label is in considerable commercial use, there are certain disadvantages associated with such use. For example, upon transfer to a surface such as a plastic bottle, a portion at least of the wax release layer is also transferred and undergoes a change from the molten to solid state. Upon solidifying, this wax coating clouds over (known as the "halo" effect) thus obscuring to some extent at least the design print.

To avoid the "halo" effect, a dry release has been attempted by superimposing relatively incompatible films of resinous film-forming materials having such slight affinity for each other that the two films can be readily separated during use. Thus, for example, it has been proposed to utilize a paper backing having a polyethylene or vinyl resin (both thermoplastic resins) release coating, with a lacquer layer over said polyethylene or vinyl resin coating. The design print is then printed over the lacquer coating and the heat-activatable adhesive is applied over the design print. Because of the release properties of the polyethylene or vinyl resin for the lacquer, the lacquer layer, while supposedly adhering sufficiently to the polyethylene or vinyl coating so as to permit the transfer as a whole to be handled as a unit is nevertheless supposedly separable during heat transfer by dry stripping from the coated carrier. However, it has been found that not only is it difficult to print on such polyethylene or vinyl resin, but also the thermoplastic polyethylene and vinyl resins tend to soften under heat transfer conditions, e.g. 300°F – 450°F, more usually 325°– 400°F, required for commercially practical dry release heat transfer. This reduces the cohesion thereof and increases the adhesion thereof to the lacquer layer. As a result, during stripping, some of the polyethylene or polyvinyl resin is apt to be removed at least in some areas with the lacquer layer and design print, which remain adhered to the transfer surface by the heat-activated adhesive, i.e. the cohesion of the resinous release layer is apt to be reduced at least in certain areas below the increased adhesion in those areas between the release layer and lacquer layer and as a result the break between the release and lacquer layers is not dependably and uniformly clean. Although, by oxidizing the polyethylene the problem of printing thereon is reduced, the problem of achieving a clean break during heat release between dry release coated paper and lacquer layer is increased.

In many applications of a heat release transfer, it is highly advantageous that the transfer be capable of being manufactured rapidly and in large quantities such as by gravure printing. However, as aforesaid, the basic characteristic of a dry heat release transfer is that the transfer design layer is imprinted on a temporary carrier having only relatively slight affinity or adherence for the design layer so as to be readily separable therefrom by dry release during heat transfer. In the web gravure printing method, the carrier, such as release coated paper, is passed successively in pressure contact with a plurality of printing cylinders for superimposing the required layers of the transfer and thereby obtaining a final composite layer usually in a plurality of different colors. It has been found that when gravure printing of a plurality of superimposed films is attempted on a carrier having a dry release coating, e.g. one other than wax or wax-like materials which split during heat release and, accordingly, which have the aforesaid "halo" disadvantage, especially serious difficulties are encountered in the printing operation as well as in the heat transfer operation. The first layer which is printed on the dry release coated paper must necessarily be relatively incompatible with and have only slight affinity for the release coating on the carrier so that the desired dry release relationship will be obtained in the final article. Accordingly, when it and the next subsequent layers are applied, there is a pronounced tendency for it to be "picked-off" or lifted from the dry release layer because of the greater affinity of it and such subsequent layers for the printing cylinder than for the release coating on the carrier. This difficulty is particularly serious in the use of a gravure printing technique because the carrier or backing is engaged with the printing cylinder or plate under pressure. Consequently, the manufacture of a relatively inexpensive dry release heat transfer by printing a plurality of superimposed films on a dry release carrier using a web gravure press or the like has not been adopted commercially. Where such attempts have been made, and web gravure printing methods have been attempted, the final heat transfer is such that transfer cannot be made on high speed apparatus without difficulty in delaminating the transfer from the transfer surface, i.e. where the adhesive bond between the release coated paper and the first printed layer is made strong enough to prevent the aforesaid pick-off, such delamination is apt to occur.

Although this is not as serious a problem with wax or wax-like (non-dry) release coatings because the adhesive bond between the wax layer and the transfer or print layer is strong enough to prevent separation during printing, this strong adhesion relied on during printing requires separation of the release coat from the transfer layer by breaking of the heat softened wax layer which results in the "halo" disadvantage and which also requires another heating operation to clarify the wax remaining on top of the design print adhered to the transfer surface.

To summarize, the use of conventional dry release layers, such as silicone, glassine, teflon, polyethylene, vinyl resins, etc. presents problems with respect to adequate adhesion of the print, i.e. the transfer layer, to the dry release layer during high speed gravure or silk screen printing and during subsequent handling. In addition, with the use of conventional thermoplastic dry release materials, such as polyethylene, vinyl resins, cellulosic materials, etc., the material appears to soften or change its form in some way during heat transfer, probably due to the elevated temperature of between 300°F and 450°F used in such dry release transfer operation, whereby the cohesion of the release layer is reduced and the adhesion thereof to the transfer layer is increased too much. As a result, some of the material remains with the design print transferred to the transfer surface, which is highly undesirable or in some cases, part of the design print remains on the release layer.

In other cases, with the use of resinous dry peel release coats it has been found that under heat transfer conditions, the cohesion of the release layer and adhered transfer layer and the adhesive strength therebetween are changed to cause the transfer layer in spots to be removed with the release layer, which is highly undesirable.

Another problem in heat transfer labelling is that the use of heat-activated rubbery thermoplastic adhesives required for transfer of the design print to certain types of plastics transfer surfaces, such as polyvinyl chloride, may cause print distortion because of the rubbery nature of the adhesive. Also, the exposed design print is subject to chemical attack and also may be injured by scuffing and handling.

Still another problem in the printing of dry peel heat transfer labels is the difficulty in achieving accurate registry of the clear adhesive layer with the design print over which the adhesive is printed, particularly where the temporary backing sheet is white or close to white. Non-registry of the adhesive with the design print has a number of disadvantages, namely, the design print is not fully covered and also the adhesive will come in contact with the dry release layer and will not separate therefrom during heat transfer since the adhesion between the adhesive and release layers is much greater than that between the transfer layer and release layer. Accurate registry is not so important with wax (non-dry peel) release layers since even if the adhesive comes in contact with the release layer, release will still occur during heat transfer by cleavage of the softened wax layer. Accordingly, the adhesive layer printed on the design print may be substantially oversized with respect to the design print to make sure the design print is fully covered even with poor registry without danger of preventing separation of the release layer during heat transfer.

Furthermore, the use of a clear lacquer layer which, together with the design print, is part of the transfer layer and which is located adjacent the dry release layer is highly preferred since the composition of the lacquer layer can be selected which provides good release from the release layer during heat transfer while at the same time providing a sufficiently strong bond to prevent separation thereof during printing, storage and handling. This permits greater freedom to use conventional design print components which are more desirable in other respects. The use of a clear lacquer layer printed on the release coat and over which the design print is printed in registry, compounds the problems of accurate registry of the lacquer coat, the design print and the adhesive.

STATEMENT OF THE INVENTION

The dry release heat transfer label and method of making and transferring the same of the subject invention overcome the aforesaid difficulties.

According to one aspect of the present invention, a dry release heat transfer label is provided in which the adhesive bond between the release layer and the transfer layer, which includes the design print with or without a lacquer layer adjacent the dry release layer, (1) is sufficient to permit printing (including gravure or silk screen) of the transfer layer on the release layer but (2) at heat transfer temperatures as high as 300°F to 450°F and higher, is (a) substantially less than the cohesions of the dry release layer, the transfer layer and the heat-activated adhesive layer and (b) substantially less than the adhesive bonds between said release layer and the temporary backing, between the transfer layer and the heat-activated adhesive layer and between the heat-activated adhesive layer and the transfer surface, such as a plastic bottle.

Accordingly, during heat transfer, the dry release layer with attached backing sheet can be readily and cleanly peeled off the transfer layer, which remains adhered to the transfer surface through the clear heat-activated adhesive without leaving any of the release layer on the transfer layer, as in the case of wax or wax-like or polyethylene release layers and without removing any of the transfer layer with the release layer. Accordingly, wax-like release layers are avoided and there is no "halo" effect associated with heat transfer.

In a preferred embodiment, this is achieved by the presence in the dry release layer (this is preferred) and/or in the transfer layer, of a cross-linked, thermoset polymeric resin, preferably non-silicone, to impart to the layer in which it is present a softening temperature substantially greater than the temperature of the dry release transfer, i.e. about 300°F to 450°F (more usually 325°F to 400°F), used for transfer to plastic surfaces, such as polyvinyl or polyalkylene surfaces, and to also impart excellent release properties to the surface of such layer in contact with the other layer while permitting printing without delamination. Although such thermoset resins are highly preferred, certain thermoplastic resins, such as polypropylene, can be used, so long as they have a softening temperature well above the temperature of the dry release transfer heat.

The term "softening temperature" as used herein with reference to the resin, as well as the dry release and transfer layers, means that the material will not soften sufficiently at dry release heat transfer temperatures, i.e. as high as about 300° to 450°F, to cause the material to lose its cohesive strength and increase its adhesive strength to adjacent layers to the extent that it will split under dry release heat transfer conditions. Accordingly, there is always a clean break between the release and transfer layers.

The statement herein that the bond between the transfer layer and dry release layer is sufficient to permit printing of the transfer and adhesive layers on the release layer without delamination of the transfer layer from the release layer means that the peel strength between the transfer layer and release layer is substantially greater than the peel strength between the transfer layer and untreated teflon release surface, between the transfer layer and untreated silicone release surfaces and between the transfer layer and untreated polyethylene release surfaces.

The term "clear" as used herein includes transparency as well as translucency.

It is also preferred that the transfer layer include one or more clear lacquer layers at least one of which is located between the design print and the dry release layer. This lacquer layer is adhered to the dry release layer, being printed on the dry release surface with the design print printed over the lacquer layer and the temperature-activatable adhesive printed over the design print.

Where such a lacquer layer is provided as part of the transfer layer and the thermoset resin is present in the transfer layer, such thermoset resin is located in the lacquer layer adhered to the release layer.

When so located, the lacquer layer, since it is rendered relatively rigid by the thermoset resin, as compared to an elastomeric resin, and since it is adhered to and covers the top of the design print after transfer and peeling away of the backing sheet and dry release layer, provides scuff and chemical resistance to the design print. Also, where the temperature-activated adhesive is elastomeric or flexible, e.g., a polyamide, as is desirable for use with a polyvinyl chloride transfer surfaces, it gives dimensional stability to the design print on the transfer surface and thereby avoids the problem of print distortion referred to above. This is another aspect of the present invention.

Preferably the thermoset resin is a cross-linked resin selected from the group consisting of acrylic resins, polyamide resins, polyester resins, vinyl resins, epoxy resins, epoxy-acrylate resins, allyl resins, aldehyde resins, such as phenol-formaldehyde resins and the amino-aldehyde resins, e.g. urea formaldehyde or melamine formaldehyde, and combinations thereof. Where the thermoset resin is used as a release coat it is preferably not plasticized to the extent that it will not have the cohesive and adhesive properties as set forth above.

The thermoset amino aldehyde resins, including copolymers of amino aldehydes with the alkyds, styrenated alkyds, esters, acrylics, polyamides and cellulosic esters, are preferred, the most preferred being copolymers of amino-aldehydes with cellulose esters, such as cellulose acetate or cellulose acetate butyrate. The most preferred amino-aldehyde is melamine aldehyde, such as hexamethoxymethyl melamine. Copolymers of hexamethoxymethyl melamine and cellulosic esters, preferably cellulose acetate butyrate or cellulose acetate, give optimum results.

Where the thermoset or other resin is in the release coat, a preferred material for the lacquer layer printed thereon, i.e., on the release coat, is a cellulosic ester, such as cellulose acetate. However, in such case, the lacquer layer may be made of other resins (1) so long as it has a softening temperature above the dry release heat transfer temperatures and (2) so long as the adhesive bond between it and the release layer is sufficient to permit printing of the transfer and adhesive layers on the release layer without delamination of the transfer layer from the release layer and (3) so long as such adhesive bond is less than the cohesions of the release layer, the transfer layer (this includes the lacquer and design print layers and the bond therebetween) and the heat activated adhesive layer and is also less than the adhesive bonds between such release layer and backing sheet, between the transfer layer and the heat-activated adhesive layer and between the last mentioned layer and the plastic transfer surface.

Where the thermoset or other resin is added to the lacquer layer, i.e. to the transfer layer, the preferred release layer is polypropylene. However, it may be of other resinous materials so long as (1) it has a softening temperature above the dry release heat transfer temperatures and (2) so long as the adhesive bond between the release layer and lacquer layer complies with the minimum and maximum requirements set forth in the preceding paragraph.

In any case, whichever of the two layers the thermoset or other resin is included in, the other layer will, of course, vary depending on such resin used to provide an adhesive bond between the two layers and a cohesion of the other layer of the strengths specified above.

In reverse, the thermoset or other resin used in either of the layers may be varied depending on the make-up of the other layer to achieve the aforesaid adhesive bond strength between the two layers and the aforesaid cohesion of the layer containing such resin.

In any event, it is highly preferred that neither the release layer nor the lacquer layer, at least where they are in contact with each other, contain any substance which is oily or liquid at heat transfer temperature since the oil or liquid, like the wax in wax release layers, will part, leaving some on the lacquer surface and some on the removed release surface.

Yet another aspect of the present invention includes the presence of a tracer compound in the clear thermoplastic heat activatable adhesive which is of sufficient clarity under ordinary light so as not to interfere with the clarity or clearness of such adhesive layer but which becomes clearly visible under light of a selected wave length or by some other excitation only so long as it is subjected to such light of selected wave length or other excitation. Accordingly, by monitoring the adhesive layer and the design print under such light of selected wave length or other excitation during or after printing of the label the adhesive is clearly visible to the eye and hence can be printed on the design print with accurate registry of the two to thereby insure that none of the adhesive is printed on the release coat and that the design print is fully covered with adhesive. One such tracer compound is a fluorescent dye of any conventional formulation or structure which becomes fluorescent and hence clearly visible under ultraviolet light. Accordingly, by over-printing the adhesive layer on the design print under ultraviolet light during printing of the label or by subjecting the over-printed label to ultraviolet light to check the registry thereof, accurate registry of the normally clear adhesive print over the design print is achieved while at the same time the adhesive remains clear as desired in the finished label.

When a clear lacquer layer is included in the transfer layer, as is preferred, the aforesaid tracer compound is also present in the clear lacquer printed on the dry release layer and either the entire printing operation is carred out under the aforesaid light of selected wave length or the finished label is subjected to such light to check registration of the lacquer layer, the design print and the adhesive layer with respect to each other. In either case, if there is a lack of accurate registry, the printing apparatus is adjusted manually in a conventional manner or automatically to make the necessary corrections to achieve accurate registration. Since the design print is usually colored and hence normally visible, it does not require any of the tracer compound, e.g. fluorescent dye, for accurate registry with the lacquer layer and/or adhesive layer but such tracer compound can be present in the design print if desired. This is particularly useful with a carrier and release layer which are light in color, e.g. white or clear.

By making the area of the lacquer layer larger than that of the design print and adhesive layer, and by proper printing registry, as aforesaid, the changes of accidentally printing any of the design print or the clear adhesive on the dry release layer with consequent sticking during dry heat release are reduced to a negligible factor.

Also, full coverage of the design print by the adhesive is assured. It is clear from the above that the design print and the adhesive print are both located marginally wholly within the lacquer print. The adhesive layer may be of the same area or larger in area than the design print so long as it is smaller in area than the lacquer print.

The use of such fluorescent or other tracer compound in the adhesive and lacquer layers may also be helpful in transferring the label to the transfer surface under ultraviolet light or other light of selected wave length under which the compound is clearly visible.

The clear lacquer and adhesive layers of the transferred label on the bottle or other transfer surface continue to be clearly visible under the light of selected wave length.

Tracer compounds which are normally of sufficient clarity so as not to interfere with the clarity of the lacquer and adhesive layers but which become clearly visible temporarily in response to energy waves, particularly light, of wave lengths other than ultra-violet light may be used, in which case the registry of the layers is monitored under such other energy wave lengths, e.g. normally clear scintillator compositions in the layers are excited by radioactivity to emit visible light. Also, normally clear thermochromatic compounds in the layers are responsive to thermal energy, such as infra red radiation, to temporarily change in hue or color.

Those compounds which are normally clear but which become fluorescent and hence more visible under ultra violet light are well known, e.g. substituted phenyl benzotriazole, sold by Ciba-Geigy under the name UVITEX OB, and other ultraviolet light sensitive triazoles. Also, the triazines, the diazines, the imidazoles, the oxazoles, the coumarins, the aminocoumarins, the sulfone sulfonic acids, the pyrazolines, the cationic oxacyanines, the imidazolones, the pyrazines, the amino naphthalimides, the oxadiazoles, the stilbenes, and the traizoles, such as 4,4', diaminostilbene-2,2'-disulfonic acid, N,N'-diacyl stilbene derivatives, N,N'dibenzoyl-4,4' diamino stilbene-2,2'-disulfonic acid, 4,4'-bis (2-hydroxy-4-anilino-1,3.5-trazinyl)-diaminostilbene-2,2' disulfonic acid, 2-naphthotriazolylstilbene, vinylene bisbenzimidazole, vinylene bisbenzoxazole, 4-methyl-7-hydroxy coumarin, 4-21kyl-7-dialkyl-amino coumarins, benzidine sulfone disulfonic acid, diphenyl pyrazoline. Any of these compounds are known and can be used in accordance with the invention. Many of these compounds are excited by radioactivity to emit visible light pulses.

The design print of the invention may be of one layer or several individual layers and may be of conventional heat transfer design print composition so long as it has a cohesion and adhesion to its next adjacent layers which will not cause splitting or peeling under dry release heat transfer conditions.

In review, the label of the present invention in one of its aspects is characterized by the composition of the release layer and transfer layer, which layers are formulated to adhere sufficiently to each other to permit printing of a design by the web gravure process and transfer as a unit to a transfer surface, but which layers are readily strip-peeled from each other during transfer without delaminating the transfer from the transfer surface. The heat transfer label of the subject invention is especially useful for high speed transfer apparatus.

The type of dry heat transfer to which the invention is particularly advantageous is that in which the release layer is in the form of a continuous layer over the backing, e.g. in the form of a roll or endless or large sheet with the transfer being applied as a print with areas of release layer exposed between the printed india. It is with this type of heat transfer where the failure to achieve accurate registry of the adhesive and design print layers is a serious problem.

DETAILED DESCRIPTION OF THE PREFERRED EMBODIMENTS

As noted above, in accordance with the invention, an essentially five layered heat-transfer label is provided having a temporary backing or carrier, a polymeric dry release layer disposed along the upper surface of the temporary backing, a clear lacquer layer printed over the upper surface of the polymeric release layer, a design print which may include a number of layers disposed upon the upper surface of the lacquer layer and an over-printed clear, heat-activatable adhesive layer.

The heat transfer label will thus be stratified as shown in Chart 1.

| (Chart 1) |
| --- |
| ADHESIVE OVERPRINT |
| DESIGN PRINT |
| PRINTED LACQUER |
| RELEASE LAYER |
| BACKING |

Upon heat transfer, the label (adhesive overprint, design print and printed lacquer) (the backing and dry release layer have been dry peeled off the lacquer layer during transfer) is firmly affixed to the transfer surface, usually plastic, such as a plastic bottle, to which it is transferred with the heat-activated adhesive over-print adhered to the transfer surface and the printed lacquer being exposed and protecting the design print. The transferred label has improved chemical and scuff resistance, is optically clear, except for the design print which may or may not be optically clear, is free of print distortion and is free from an overlay of release layer material as opposed to heat transfer labels of the prior art.

The temporary backing or carrier may comprise any suitable material conventionally used as carriers for heat transfers, such as plastic film, metal foil or paper. However, from both a stand-point of expense and ease of handling, it has been found most desirable to use a smooth clay coated paper, preferably with good holdout of the dry release layer composition applied thereto during manufacture.

As aforesaid, the heat release layer and/or the printed lacquer layer is preferably of a non-silicone, cross-linked, thermoset polymeric resin which will not become molten upon application of heat as used in heat transfer, i.e. 300°F to 450°F, in accordance with the process described herein, i.e. it has a softening temperature above 300°–450°F, a preferred thermoset resin being an amino aldehyde resin, such as a urea formaldehyde and/or melamine formaldehyde resin.

As is known in the art, these amino aldehydes are frequently copolymerized or modified with a cellulosic ester such as cellulose acetate, cellulose butyrate, cellulose propionate, or cellulose acetate butyrate in amount up to about 80% or 90% by weight of the total polymer composition. In a preferred embodiment of this invention, the amino aldehyde is copolymerized with such a cellulosic resin, most preferably, with cellulose acetate butyrate in an amount of from 10% to 80% by weight, preferably in an amount of from 25% to 50% more preferably in an amount of from 30% to 40%.

As is also known in the art, these uncured amino aldehyde resins contain a curing catalyst that causes the resin to cure (thermoset) and stiffen upon application of heat or with the passage of time. Typically, a free acid or a salt or ester of a free acid that will liberate the acid at high temperature serves as such a catalyst. A preferred heat curing catalyst for such purpose is para toluene sulfonic acid. It is preferred that the uncured amino aldehyde resin be a catalyzed resin. Any conventional heat curing catalyst can be used.

I will first describe the manufacture of the dry heat transfer label of the invention with the thermoset resin in the release layer and then I will describe the label with the thermoset resin in the lacquer layer.

THERMOSET RESIN IN RELEASE LAYER

When the thermoset resin is employed in the release layer, it, the release layer, may be coated on the backing paper at a rate of 1 to 5 pounds per ream of paper (where a ream of paper comprises 500 sheets measuring 20 inches by 25 inches). Thus, if the carrier paper consists of about 16 pound paper having a thickness of about 2½ mils, the thickness of the heat release layer will be about ½ mil at 5 pounds coating per ream or about ¼ of the thickness of the paper backing after drying and curing.

The dry release layer thermosetting resin, e.g. the amino aldehyde resin, such as polyalkoxyalkyl melamine, together with a cellulosic ester with which the melamine is to be copolymerized, such as cellulose acetate butyrate, together with a curing catalyst, such as p-toluene sulfonic acid, is coated on the backing paper as a partially cured or uncured solution followed by a heat curing on the backing paper at conventional recommended curing temperatures of 250°F to 350°F to the thermoset resin.

The resulting cured dry release layer of thermoset resin has a cohesive strength at dry release heat transfer temperatures substantially greater than its adhesive strength to the lacquer layer subsequently printed thereon.

Following application of the release layer, the release layer coated backing is then print coated with the printed clear lacquer, preferably a clear cellulosic resin, such as a cellulosic ester, having a softening point well above 300°F to 450°F, i.e. the cellulosic resin used is one that does not appreciably soften or tackify at transfer temperatures. The preferred cellulosic ester is cellulose acetate.

The clear cellulosic ester can be applied to the release layer in conventional lacquer form as a solution (a solid content suitable for the particular printing conditions used) by the gravure process and is applied in such a manner that its printed area is larger than that of the design print and heat activatable adhesive to follow. This layer, after drying, serves as a primer and foundation for the design print and prevents the ink of the design print from migrating or striking into the release layer during label formation. In addition, it provides chemical and scuff resistance for the label after it has been transferred.

The dried lacquer layer, at heat transfer temperatures, has a cohesive strength and adhesive strength to the design print subsequently printed thereon substantially greater than the adhesive strength thereof to the release layer.

As noted above, the combination of the thermoset amino-aldehyde dry release layer with the cellulosic resin lacquer layer results in a bond between the two layers that is of sufficient strength to adhere during printing, storage and handling, but is readily broken when the temporary backing is peeled from the transfer during heat transfer without delaminating the transfer, i.e. the adhered lacquer layer, design print and adhesive unit, from the transfer surface. As a result, it is not necessary for the release layer to melt upon transfer and thus, a portion of the release layer is not carried over with the transfer and the problem of lack of clarity and "halo" effect are avoided.

The design print is print coated in conventional manner directly onto the printed lacquer layer and dried in a manner dependent upon the exact nature of the design. Thus, the ink utilized in the design print may vary from 1 to 6 colors depending upon the label and these separate steps. Conventional heat transfer inks may be used such as the nitrocellulose and/or polyamide inks, containing dispersed or dissolved therein pigments and/or dyes of the color desired, and have at heat transfer temperatures a cohesive strength and adhesive strength to the lacquer layer and to the subsequently overprinted heat-activatable adhesive layer substantially greater than the adhesive strength between the dry release and lacquer layers. The area size of the design print is smaller than that of the lacquer layer. The design print is located marginally within the lacquer layer so no part thereof contacts the thermoset release layer.

After the design has been deposited on the lacquer layer, the overprint heat-activatable thermoplastic adhesive layer of conventional composition is then applied to the top of the design print as a solution followed by drying. The adhesivee layer may comprise a thermoplastic polyamide, which is non-tacky under normal conditions but becomes tacky at heat transfer temperatures of 300°–450°F and which is known in the art and which is preferably applied as a lacquer. Such a layer is useful for labelling treated, e.g. flamed, polyolefin bottles. When polyvinyl chloride surfaces, e.g., polyvinyl chloride bottles, are to be labelled, the preferred heat activatable adhesive is a conventional plasticized polyamide or a conventional vinyl acrylic resin. The adhesive layer is applied in such a manner that the printed area of adhesive is larger than that of the design print but smaller than that of the lacquer layer, thus encapsulating the design between the lacquer and adhesive layers but with no part of the adhesive in contact with the dry release layer, i.e. the printed adhesive layer lies marginally within the printed lacquer layer. The purpose of the adhesive layer is to provide a heat-activated adhesion for the label when it is transferred to the transfer surface.

The vinyl acrylic material used as an adhesive is either a blend or copolymer of a vinyl resin such as polyvinyl butyrate with an acrylic resin such as that formed from acrylic acid or a derivative thereof such as methyl methacrylate. These vinyl acrylic materials are standard items of commerce and come in both powder and lacquer form where both the vinyl resin and the acrylic resin are dissolved in a common solvent.

Any conventional heat-activatable adhesive, usually thermoplastic resins, suitable for strong heat-activated (at heat transfer temperature) adhesion to the particular plastic transfer surface to which the label is to be transferred can be used so long as such strong adhesion, as well as the adhesion of the heat activated adhesive to the design print and the cohesive strength of the heat activated adhesive are all greater than the adhesive strength of the lacquer and dry release layer bond.

The heat transfer label is utilized by bringing the over-print adhesive layer in contact with the surface to be labelled, e.g. a plastic container. While the label and container are in contact, transfer is accomplished by applying heat and pressure, preferably to the back of the temporary backing such as by use of a heated roll at a temperature between about 300°F and 450°F and preferably at a temperature of about 350°F. The transfer can also be preheated if desired. After the transfer, the backing and release layer may be immediately peeled as a unit from the transfer now adhered to the transfer surface or may be allowed to cool and peeled thereafter without danger of delamination of the transfer from the transfer surface. Either way, the lacquer layer-design print-adhesive layer unit is left attached to the transfer surface. To firmly secure the adhesive layer to the plastic or other transfer surface, the transferred transfer is subjected to a post-heating operation well above the softening point of the adhesive and the transfer temperature.

A suitable apparatus for affecting the transfer is described in U.S. Pat. No. 3,434,902 of Bliss. An additional apparatus is described in copending U.S. patent application Ser. No. 857,268 assigned to the assignee of the subject application.

When the transfer has been completed, the label comprises three layers. The first layer is the thermoplastic adhesive by which the label is bonded to the transfer surface — e.g., the plastic bottle. The second layer is the decorative design print and the third layer is the lacquer layer.

THERMOSET RESIN IN TRANSFER LAYER

I will now describe the manufacture of the heat transfer label with the thermoset resin located in the transfer layer, i.e. in the lacquer layer of the transfer layer.

The resinous dry heat release layer may be a thermoset or thermoplastic resin selected to form a bond with the thermoset resin-containing lacquer to be subsequently printed thereon which is sufficient to permit printing of the transfer layer and adhesive layer on such release layer without delamination of the transfer layer from the release layer, as aforesaid. Furthermore, the resin forming the release layer must have at heat transter conditions a cohesive strength and an adhesive strength to the carrier sheet substantially greater than the adhesive strength thereof to the thermoset resin-containing transfer layer.

It has been found that the higher non-rubbery polyalkylenes, i.e. higher than ethylene, such as polypropylene have these properties. Polypropylene is preferred.

Polypropylene has a softening temperature greater than 300°F–450°F.

The polypropylene may be coated on the backing paper at a rate of 1 to 10 pounds per ream of paper (where a ream of paper comprises 500 sheets measuring 20 inches by 25 inches). Thus, if the carrier paper consists of about 16 pound paper having a thickness of about 2½ mils, the thickness of the heat release layer will be about 1 mil at 10 pounds coating per ream of about ½ the thickness of the paper backing. The polypropylene is preferably applied by extrusion.

Following application of the dry release layer to the backing paper, such layer is printed coated with the lacquer of thermoset resin, such as an uncured amino aldehyde and cellulosic ester and catalyst, followed by heat curing of the print coating on the backing.

Preferably, the lacquer applied to the dry release coat also contains, in addition to the amino-aldehyde and cellulosic ester, vinyl acrylic resins, which are a blend or copolymer of a vinyl resin, such as polyvinyl chloride, polyvinyl alcohol or polyvinyl butyrate, and an acrylic resin such as that formed from acrylic acid or a derivative thereof such as methyl methacrylate. The acrylic and vinyl resins and amino-aldehyde resins are fomulated in the lacquer so that after curing the composite lacquer layer has a softening temperature above heat transfer temperature and so that its adhesive strength during heat transfer to the release layer is substantially less than its cohesion and its adhesive strength to the subsequently applied design print.

The vinyl acrylic resin is believed to toughen the aminoformaldehyde resin and reduce its brittleness to better withstand scuffing and handling. It also contributes to the proper adhesion between the transfer layer and the release layer when polypropylene is used for the release layer. The ratio of the vinyl propylene is used for the release layer. The ratio of the vinyl acrylic resin to the urea-formaldehyde resin may vary within relatively broad limits. Generally the vinyl acrylic resin comprises from 10 to 90% by weight of the total dry cured lacquer layer, preferably 40 to 80%, and most preferably, from 60 to 70% with the urea-formaldehyde resin comprising the balance, but for minor amounts of other materials such as a catalyst for curing the resin and the like.

The urea-formaldehyde-vinyl acrylic mixture can be applied to the release layer by the gravure process.

The design print is coated in reduced area directly onto the lacquer layer and the heat-activatable adhesive is applied to the design print in the same way they are applied when the thermoset resin is employed in the release layer as described above.

REGISTRATION AND THE TRACER COMPOUND

In a preferred embodiment, whether the thermoset resin is employed in the dry release layer or the lacquer layer, a fluorescent dye is present in the clear lacquer applied to the release coat and in the clear heat-activatable adhesive applied to the design print in an amount between about 0.1% to 10% by weight, more preferably between 1 and 3 or 5%, based on solids in such lacquer and adhesive, respectively, and either the printing of all the layers, i.e. the lacquer layer, design print and adhesive layer, is carried out under ultraviolet light which causes the dye to fluoresce so that it is clearly visible as it is printed, or, upon completion of the printing operation, the printed label is subjected to ultraviolet light to cause fluorescence and thereby observe visually accuracy of registration of the printed layers.

The minimum amount of fluorescent dye is dictated only by the amount required to provide adequate visibility under ultra-violet light to achieve accurate registration and the maximum amount is dictated only by that amount beyond which the dye commences to deleteriously effect the desired cohesiveness of the layers in which it is present and the adhesiveness of such layers to adjacent layers. Also, in the case of the heat-activatable adhesive layer the amount of dye should not be so great as to deleteriously affect the heat activatable adhesiveness thereof, Although the fluorescent dye can be employed in the design print it is not required in most cases for accurate registry since in most cases the design print is colored and hence is clearly visible.

The fluorescent dye or other tracing material for achieving accurate print registration can be used to advantage in the lacquer and adhesive layers even where the conventional wax and wax-like release layers are used and the aforesaid advantages achieved thereby are independent of the make-up of the lacquer and release layers as well as the adhesive layer. They are also independent of the dry peel aspects of the invention. However, the need for such tracing material for accurate printing registry is not as great with a wax release layer since perfect printing registry is not so critical.

The principle of using a tracer compound in the clear print layers can be used in any over-printing process where clear layers are used.

It is useful, for example, in preparing pressure sensitive transfer labels, as well as solvent or moisture sensitive transfer labels, where over-printing of clear layers is used.

In fact, it has utility in over-printing processes involving clear layers which are not even related to transfer labels.

The present invention may more clearly be understood by reference to the following examples, it being understood that such examples are illustrative and not to be considered as limiting of the invention.

EXAMPLE 1

A carrier paper made of a smooth clay coated sheet weighing about 16 pounds per ream (500 sheets, 20 inches by 25 inches) is dry release coated (No. 20 Mayer rod) with a 30% solids lacquer of an uncured catalyzed urea-formaldehyde resin modified with 36% cellulose acetate butyrate (S-1028, Raffi-Swanson, Incorporated). The catalyst used is 4 parts of a para toluene sulfonic acid solution (Catalyst 7909, Raffi-Swanson, Incorporated) per 100 parts of resin. The urea-formaldehyde and cellulose acetate butyrate in the applied release layer are cured to a cross-linked thermoset resin by heating on a hot drum at 350°F for 20 seconds after the applied lacquer has been dried at a temperature of 140°F for 1 minute. The cured urea-formaldehyde resin dry release layer is then print coated with a clear lacquer (15% solids) of cellulose acetate (E3983 Eastman Chemicals) in methyl ethyl ketone. Print coating is accomplished using a regular varnish etch cylinder having a depth of about 20 to 40 microns-120 line screen and a 15–20 wall (equivalent to No. 8 Mayer rod). The applied lacquer coating is dried at 140°F for 1 minute.

The design print is then printed over the clear lacquer layer using polyamide-nitrocellulose modified ink containing pigment or dye of the color desired (ZYROTO WHITE, solid by Gotham, Ink and Color Co. which contains a titanium dioxide pigment). The area of the design print is smaller than that of the printed lacquer layer and falls wholly within the margin of the lacquer layer.

Over the ink, as an overprint, there is then coated a clear adhesive layer comprising a solution of a heat-activatable thermoplastic polyamide resin in lacquer form (VERSAMIDE 940 sold by General Mills) followed by drying the adhesive to a dry non-tacky state. The area of the adhesive overprint is smaller than that of the lacquer and it falls wholly within the margins of the lacquer layer.

There is no pick-up during the three printing operations.

The heat transfer label, as formed above, is then put in contact with a polyethylene bottle, the surface of which has been treated to render it more print receptive in a conventional manner such as by flame contact. Heat and pressure are applied to the temporary backing to effect pressing of the adhesive layer against the polyethylene surfaces. As heat is applied, approximately 350°F, there is no softening of the release layer or the cellulose acetate layer, but the adhesive overprint is heat-activated to a highly tacky state and bonds to the polyethylene surface of the bottle. The temporary backing may then be stripped from the transfer label or may be left on the transfer and stripped at a subsequent time without danger of delaminating the transfer from the polyethylene surface. No portion of the release layer is left over the transfer after stripping of the temporary backing and no portion of the lacquer is removed with the release layer. After cooling and peeling of the temporary backing, the bottle so coated is flame treated and the adherence of the label thereto is determined. Adherence was excellent.

EXAMPLE 2

The procedure of Example 1 is repeated, but the urea-formaldehyde resin content is decreased to 25% by weight while that of the cellulose acetate butyrate is increased to 75%. Similar results are obtained.

EXAMPLE 3

The procedure of Example 1 is repeated, but the ureaformaldehyde resin content is increased to 80% by weight while the cellulose acetate butyrate content is decreased to 20%. Similar results are obtained.

EXAMPLE 4

The procedure of Example 1 is repeated substituting a polyvinyl acrylic heat-activated adhesive (RO-120-S, Frederick H. Levy Co.) layer for the polyamide adhesive and by labelling a glass bottle coated with a polyvinyl chloride from a plastisol. No surface preparation of the bottle is needed as with polyethylene. The results obtained are similar to those of Example 1.

EXAMPLE 5

Example 1 is repeated except an acrylic-based release coating solution is used instead of urea-formaldehyde-cellulose acetate butyrate and is prepared by mixing 33 parts of a self-cross-linking acrylic (consisting of a 50% solids solution of the acrylic in a solvent mixture xylene/butanol/methyl cellulose = 60/22/18 (AT-50, Rohm and Haas Co.)) with 67 parts of toluene and except that a 10% solids cellulose acetate lacquer solution is used. Following coating of the release layer on the backing sheet (drawdown) and drying, the cotaing is cured in an oven at 320°F for 35 minutes. The results obtained are similar to Example 1 at heat transfer temperatures of between 315° and 360°F.

EXAMPLE 6

Example 5 is repeated except that the release coating solution consists of AT-50, 85 parts, 15 parts of an epoxy resin mixture consisting of a liquid diglycidyl ether of bis-phenol A, 85% (Bakelite ERL 2774, Union Carbide), and a solid, higher molecular weight addition product of diglycidyl either of bis-phenol A, 25% (Epon 1004, Shell Chemical Co.) and toluene, 100 parts. Curing is accomplished at 320°F for 60 minutes after drying. The results are the same as Example 5.

EXAMPLE 7

Example 5 is repeated except that the release coating solution is prepared from 75 parts of the epoxy resin mixture of Example 6, 25 parts of a polyamide derived from the condensation product of "dimer acid" and an aliphatic polyamine (Versamid 125, General Mills, amine value 330–360) and 100 parts of methyl ethyl ketone. Curing takes place at 320°F for 30 minutes. The results are the same as Example 5.

EXAMPLE 8

Example 5 is repeated except that the release coating solution consists of 14 parts of hexamethoxymethyl melamine (Cymel 301, American Cyanamid), cellulose acetate butyrate (EAB 500-5 Eastman) 75 parts, (15% in methyl ethyl ketone), 2 parts catalyst No. 1010 (25% P-toluene sulfonic acid in butanol, American Cyanamid) and 60 parts of ethyl acetate. Curing takes place over a hot drum at 350°F for 20 seconds. The cellulosic lacquer used is cellulose acetate (E-398-3, m.p. 230°–250°C, Eastman). The release results are better than Examples 1 or 5. Furthermore, the use of this release coating solution has the advantage over Example 1 that there is no excess of semi-toxic formaldehyde which volatizes during transfer and has an unpleasant odor.

EXAMPLE 9

Example 8 is repeated except that the lacquer is cellulose acetate butyrate (EAB-171-40, m.p. 230°–240°C, Eastman). The results are the same as Example 5.

EXAMPLE 10

Example 5 is repeated except that the release coating solution consists of a mixture of burylated urea-formaldehyde, 30.2 parts (60% solids in butanol/xylene - 3/1, Resimene U-920, Monsanto Co.), 9.8 parts cellulose acetate butyrate (EAB 500-5, Eastman), 58 parts ethanol and 2 parts ethyl acetate. 65.8 parts of the above mixture is catalyzed with 2.7 parts of p-toluene sulfonic acid (60% in butanol) and diluted with 19.5 parts of ethyl acetate. Curing takes place over a hot drum at 350°F for 20 seconds. The results are the same as Example 5.

EXAMPLE 11

Example 10 is repeated except that the lacquer layer is cellulose acetate butyrate (EAB 171-40, Eastman). The results are the same as Example 5.

EXAMPLE 12

Example 5 is repeated except that the coating solution consists of a mixture of a solid epoxy resin, 25 parts, (Araldite 7097, Ciba-Geigy Corp.) a liquid epoxy resin, 25 parts (Bakelite ERL 2774), methyl ethyl ketone, 50 parts, and 3 parts of diethylene triamine as the curing agent. Curing is accomplished at 310° F for 50 minutes. The results are the same as Example 5.

EXAMPLE 13

Example 5 is repeated except that the release coating solution consists of 15 parts of the malamine resin (Cymel 301) 85 parts of a modified polyester (Cyplex 1473-S, 65% in xylene, American Cyanamid), 2 parts of a catalyst consisting of 25% p-toluene sulfonic acid in butanol (catalyst 1010, American Cyanamid) and 50 parts of methyl ethyl ketone. Curing is accomplished at 310°F for 30 minutes. The results are the same as Example 5.

EXAMPLE 14

Example 5 is repeated except that the release coating solution consists of 60 parts of a butylated urea formaldehyde solution (50% in xylene/butanol-1/1, Beetle XB-1047, American Cyanamid) 40 parts of an acrylic resin (50% in xylene/cellosolve acetate — 3/1, AT-70 Rohm and Haas Co.) 50 parts in methyl ethyl ketone, and 2 parts of catalyst No. 1010. The Coating is cured over a hot drum at 315°F for 30 seconds. The results are the same as Example 5.

EXAMPLE 15

Example 5 is repeated except that the release coating solution consits of the burylated urea-formaldehyde, 60 parts, (XB-1047) 25 parts of an alkyd resin (50% in xylene, 320-5, Koppers Co.), 18 parts methyl ethyl ketone, and 2 parts catalyst No. 1010. The coating is cured over a hot drum at 315°F for 30 seconds. The results are the same as Example 5.

EXAMPLE 16

Example 5 is repeated except that the release coating solution consists of the butylated urea-formaldehyde resin, 60 parts, (XB-1047) 40 parts of a styrenated alkyd resin (60% in xylene, S112-4, Koppers Co.) 25 parts methyl ethyl ketone and 2 parts of the catalyst No. 1010. The coating is cured over a hot drum at 315°F for 30 seconds. The results are the same as Example 5.

EXAMPLE 17

Example 5 is repeated except that the release coating solution is a mixture of 60 parts of XB-1047, 40 parts of a flexibilized bisphenol A epoxy acrylate (60% in methyl ethyl ketone, Epocryl 25-B-60, Shell Chemical Co.) 2 parts of catalyst No. 1010, and 50 parts of methyl ethyl ketone. Curing occurs at 300°F for 30 minutes. The results are the same as Example 5.

EXAMPLE 18

Example 5 was repeated except that the release coating solution is a mixture of 62 parts of XB-1047, 28 parts of epoxy resin (Bakelite ERL 2774), 2 parts of catalyst No. 1010, and 50 parts of methyl ethyl ketone. Curing is accomplished at 300°F for 30 minutes. The minutes are the same as Example 5.

EXAMPLE 19

A carrier paper made of a smooth clay coated sheet weighing about 16 pounds per ream (500 sheets measuring 20 inches by 25 inches) is extruded with a coating layer of polyproplene. The polypropylene coated paper is then print coated with a lacquer comprising 67% by weight of the vinyl acrylid resin (RO-120-S, Frederick H. Levey Co.) and 33% of an uncured catalyzed urea-formaldehyde resin modified with 43% cellulose acetate butyrate (S-487, Raffi-Swanson). The lacquer has a solids content of about 30% diluted with ethyl acetate. The catalyst used is 0.12 parts of a para toluene sulfonic acid solution (Catalyst 7909, Raffi-Swanson, Incorporated) per 100 parts or resin. Print coating is accomplished using a regular varnish etch cylinder having a depth of about 40 microns, 120 line screen, and a 15–20 wall with a lacquer solution of about 20% solids. Drying at 140°F for one minute is followed by curing the urea-formaldehyde-cellulose acetate butyrate on a drum at 350°F for 20 seconds. The lacquer coat was clear.

The design print is then printed over the lacquer layer, using polyamide-nitrocellulose modified ink, as per Example 1 and dried.

Over the dried ink, as an overprint, there is then coated a clear adhesive layer comprising a solution of a heat activatable plasticized thermoplastic polyamide resin in lacquer form followed by drying as in Example 1.

There was no pick-off during the three printing operations.

The heat transfer label, as formed above, is then put in contact with either a polyethylene bottle or a polyvinyl chloride bottle, the surface of this polyethylene bottle being treated to render it more print receptive in a conventional manner such as by flame contact. Heat and pressure are applied to the temporary backing to effect pressing of the adhesive layer against the polyethylene surface. As heat is applied, approximately 350°F, there is no softening of the release layer or the lacquer layer to the extent that it could interfere with transfer, but the adhesive overprint is heat activated from a non-tacky to a tacky state and bonds to the polyethylene surface of the bottle. The temporary backing may then be stripped from the surface label or may be left on the transfer and stripped at a subsequent time without danger of delaminating the transfer from the polyethylene surface. No portion of the release layer is left over the transfer after stripping of the temporary backing. After cooling and peeling of the temporary backing, the bottle so coated after flaming, is tested to determine the adherence of the label thereto. The adherence was excellent.

EXAMPLE 20

The procedure of Example 19 is repeated, but the urea-formaldehyde resin content is increased to 50% by weight while that of the vinyl acrylic is decreased to 50%. Similar results are obtained.

EXAMPLE 21

The procedure of Example 19 is repeated, but the urea-formaldehyde resin content is increased to 60% by weight while the vinyl acrylic content is decreased to 40%. Similar results are obtained.

EXAMPLE 22

A transfer decoration for plastic bottles is prepared from a roll of white paper having the cured release coating of Example 8. Using a rotogravure printing press (6 stations), there is first printed and dried, a clear lacquer consisting of cellulose acetate, 10 parts, (E398-3, Eastman) dissolved in 90 parts of methyl ethyl ketone/acetone — 9/1, and containing 0.1475 parts of a fluorescent dye (a substituted phenyl benzotriazole sold under the name Intrawite OB by Intracolor Corp.). Successively, and inside the periphery of the first printed dried clear lacquer, there is printed 4 different colors each with a polyamide-cellulose nitrate base each containing a different colored pigment, and finally at the sixth station, there is printed an overall (but inside the periphery of the first clear lacquer) clear heat-activatable adhesive lacquer consisting of 30 parts of a mixture of a heat activatable polyamide (Versamid 940, General Mills) and nitrocellulose (SS, 1/4 second, Hercules Chemical Co.) in a ratio of 85:15 respectively, and 70 parts of a solvent mixture consisting of isopropanol: toluene: ethyl acetate in a ratio of 4: 1: 1. There is added to this mixture before printing 4 parts of triphenyl phosphate plasticizer and 0.1475 parts of the fluorescent dye. The applied heat-activatable adhesive overprint was dried to a non-tacky but heat activatable state. The final print is monitored after the sixth station under untraviolet light, which fluoresced the dye to make it clearly visible, whereby it is possible to keep the two clear lacquers containing the fluorescent dyes and the ink prints in perfect printing registration.

There was no pick-of during printing and the release layer stripped clean from the lacquer layer at heat transfer temperatures of 315°–360°F.

EXAMPLE 23

The procedure of Example 1 is repeated, except the fluorescent dye of Example 22 is added to the lacquer and heat-activatable adhesive layers in the same amount as in Example 22. The results are similar to those of Example 22.

EXAMPLE 24

Example 19 is repeated except that the fluorescent dye of Example 22 is added to the lacquer and adhesive layers in the same amount as in Example 22.

EXAMPLE 25

Example 19 is repeated except that instead of a polypropylene release layer there was a wax formulation comprising a mixture of paraffin and Montan waxes (70:30) and also the lacquer and adhesive layers contained the fluorescent dye of Example 22 in the same amount. Monitoring in ultraviolet light permitted perfect print registration.

It will be obvious to those skilled in the art that various changes may be made without departing from the scope of the invention.

What is claimed is:

1. A label for transferring a design print to a receiving surface, comprising a temporary backing;
a resinous release layer upon said backing;
a transfer layer including a design print upon said resinous release layer;
and a heat-activatable adhesive layer upon said transfer layer; the bond between said release layer and said transfer layer at the transfer temperature being less than the bond formed between the adhesive layer and the receiving surface;
thereby to permit the application of said design print to said receiving surface and its immediate stripping from said release layer at the transfer temperature.

2. A heat transfer label in accordance with claim 1 wherein said bond between said release layer and said transfer layer is less than the bond formed with said receiving surface at temperatures in excess of about 300°F (150°C) and particularly in the range from 325°F (160°C) to 400°F (205°C).

3. A heat transfer label in accordance with claim 1 wherein
said release layer is thermosetting and is selected from the group consisting of acrylic resins; polyamide resins; polyester resins; vinyl resins; epoxy resins; allylic resins; epoxy-acrylate resins; aldehyde resins; amino aldehyde resins, including copolymers with alkyds, styrenated alkyds, polyesters, acrylics, polyamides and cellulose esters; urea-formaldehyde and melamine formaldehyde copolymerized with a cellulose ester; and polyalkoxy melamine copolymerized with a compound selected from the group consisting of cellulose acetate butyrate and cellulose acetate.

4. A heat transfer label in accordance with claim 1 wherein said transfer layer is selected from the group consisting of cellulose esters including cellulose acetate and cellulose acetate butyrate.

5. A heat transfer label in accordance with claim 1 in which the area of said adhesive layer is less than the area of said transfer layer, said adhesive layer is in registry with said transfer layer to prevent any substantial contact between said adhesive layer and said release layer, and said adhesive layer is printed in registry with and overlapping said design print.

6. A heat transfer label in accordance with claim 1 wherein said transfer layer includes a lacquer layer adhesively bonded to said release layer.

7. A heat transfer in accordance with claim 6 wherein said lacquer layer contains a resin selected from the group consisting of a vinyl resin, an acrylic resin and combinations thereof.

8. A heat transfer label in accordance with claim 1 wherein said adhesive layer or a constituent of said transfer layer is transparent.

9. A heat transfer label in accordance with claim 1 wherein said adhesive layer or said transfer layer includes a tracer material which is sensitive to wave energy lying outside of the visible spectrum to permit accurate registry of said adhesive or said transfer layer.

10. A heat transfer label in accordance with claim 9 wherein said tracer material is a fluorescent dye.

11. A heat transfer label in accordance with claim 1 wherein said release layer comprises polypropylene.

* * * * *